W. H. COTTON.
THERMO POULTRY FOUNTAIN.
APPLICATION FILED MAR. 22, 1913.
1,102,572.
Patented July 7, 1914.
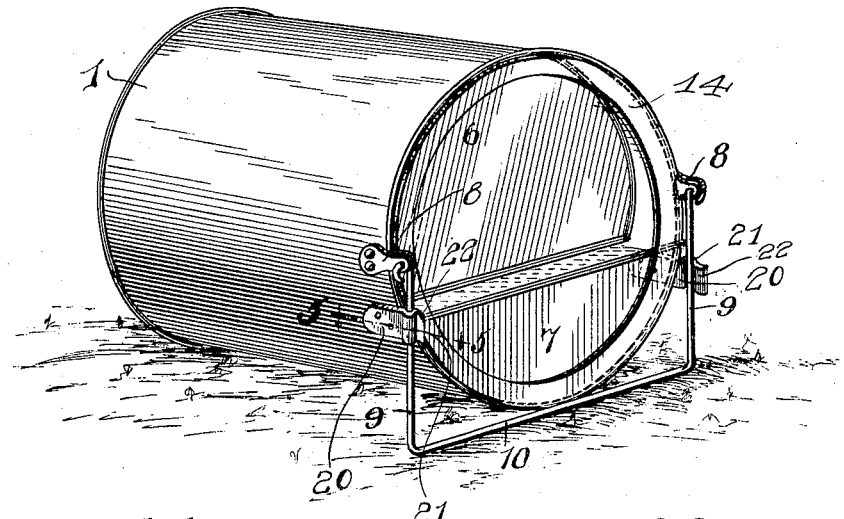
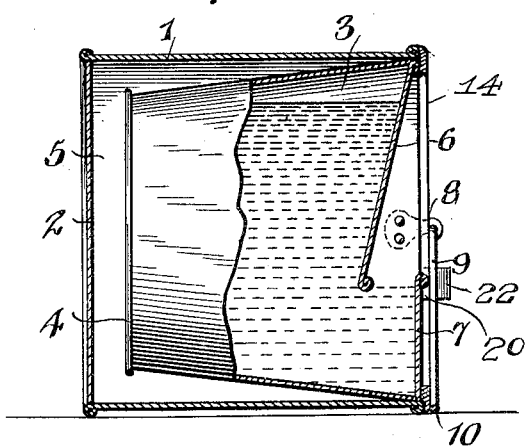
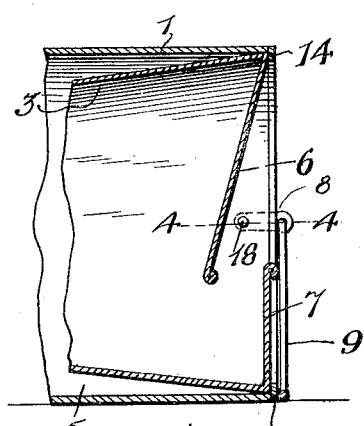
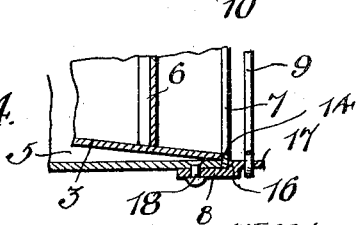
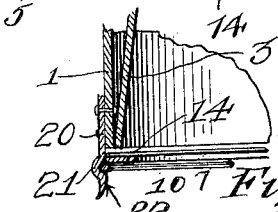
WITNESSES
William H. Cotton, INVENTOR
his Attorney

UNITED STATES PATENT OFFICE.

WILLIAM H. COTTON, OF SALEM, NEW YORK.

THERMO POULTRY-FOUNTAIN.

1,102,572.   Specification of Letters Patent.   Patented July 7, 1914.

Application filed March 22, 1913. Serial No. 756,210.

*To all whom it may concern:*

Be it known that I, WILLIAM H. COTTON, a citizen of the United States, residing at Salem, in the county of Washington and State of New York, have invented certain new and useful Improvements in Thermo Poultry-Fountains, of which the following is a specification, reference being had therein to the accompanying drawing.

This invention relates to a drinking fountain for fowls, and has for its object the production of a thermal drinking fountain which will keep the water contained therein at a fixed temperature for a considerable length of time.

Another object of the invention is the production of a bail member which is so constructed as to prevent the fountain from rotating after the same is positioned upon a support.

With these and other objects in view this invention consists of certain novel combinations, constructions, and arrangements of parts as will be hereinafter fully described and claimed.

In the accompanying drawing:—Figure 1 is a perspective view of the drinking fountain. Fig. 2 is a central longitudinal section of the same showing a portion of the inner casing in side elevation. Fig. 3 is a longitudinal section of the forward portion of the invention. Fig. 4 is a section taken along the line 4—4, of Fig. 3. Fig. 5 is a section taken on the line 5—5 of Fig. 1 looking in direction of the arrow.

Referring to the accompanying drawing by numerals 1 designates a cylindrical outer casing which is provided with the usual back 2. This casing carries upon its inner portion the inner casing 3 which constitutes a container for the water. This casing 3 converges toward the inner end and is provided with the back 4. The outer end of the casing 3 is secured within the outer casing 1 in a manner hereinafter described whereby there will be formed an air tight compartment 5 around the sides and end of the casing 3. The outer end of the casing 3 is provided with an angular leaf portion 6 and with an upstanding lip 7 whereby the water contained within the casing 3 will only rise to a predetermined height.

In forming the fountain above described the water is first placed in the casing 3 at which time the fountain is placed upon the support. By constructing the leaf 6 and the lip 7 so as to limit the height to which the water is raised the water will be prevented from overflowing the lip while the space illustrated at 5 will be a dead-air space whereby the temperature of the water will remain for a considerable time the same as when it is placed within the casing 3.

In order to prevent the casing 1 from revolving after the same has been placed upon a support and thereby spilling the water, the sides of the casing 1 are provided with bail receiving ears 8 to which the bail is attached. This bail is provided with the parallel sides 9 which are connected by means of the projecting portion 10 whereby the bail is formed in a substantially U-shaped member. The projecting portion 10 normally rests upon a support and will in this manner prevent the fountain from rotating after the same has been placed upon its side portion.

As illustrated in Fig. 4, the casing 1 carries the inner casing 3. In order to hold the inner casing 3 within the casing 1 there is provided a retaining ring 14 which fits upon the outer edges of the casings 1 and 3. In order to hold this ring in position the bail retaining ears 8 are formed to constitute a shoulder 16 whereby the outer portion 17 of each ear will be placed out of alinement with the inner portion. These ears are held upon the casing 1 by means of the rivets 18 whereby when the device is assembled, the shoulders 16 will spring over the ring 14 and will in this manner hold the casing 3 within the casing 1.

From the foregoing description it will be seen that a simple drinking fountain has been produced which will keep the water contained therein at a pre-determined temperature for a considerable time which is provided with a simple means for preventing rotation of the casing whereby the water would spill therefrom. It will, therefore, be seen that a simple device has been produced for holding the several parts in position and which may be easily disassembled when so desired.

It will be seen that the body 1 is provided with a plurality of bail engaging clips 20 which are provided with the bowed portions 21 and beveled portions 22 whereby the vertical portions 9 of the bail may ride upon the pivotal portion 22 and into the bowed portion 21 for locking the bail in engagement with the ground whereby the same will be prevented from accidental removal from engagement with the ground which would cause the fountain to overturn and spill the contents contained therein.

Having thus described the invention what is claimed as new, is:—

A drinking fountain for fowls comprising an outer cylindrical casing, an inner casing carried by said outer casing, said inner casing provided with converging sides so as to form a dead air space between said casings, said inner casing provided with means for preventing the water contained therein from overflowing, a ring positioned upon the outer ends of said casings for holding the same in position, a plurality of ears carried by said outer casing, each of said ears provided with a shoulder portion, said shoulder portion fitting upon said ring for holding said ring upon said casing, and a bail carried by the outer end of said ears and adapted to rest upon a support for preventing the rotation of said fountain after the same has been placed upon the support.

In testimony whereof I hereunto affix my signature in presence of two witnesses.

WILLIAM H. COTTON.

Witnesses:
 THOS. H. LORD,
 ALBERT H. BARNES.

---

Copies of this patent may be obtained for five cents each, by addressing the "Commissioner of Patents, Washington, D. C."